(12) United States Patent
Bradbury et al.

(10) Patent No.: US 7,651,040 B2
(45) Date of Patent: *Jan. 26, 2010

(54) ADDITIVE FOR INCREASING THE DENSITY OF AN OIL-BASED FLUID AND FLUID COMPRISING SUCH ADDITIVE

(75) Inventors: Andrew J. Bradbury, Banchory (GB); Jarrod Massam, Stone Haven (GB); Christopher A. Sawdon, Par (GB)

(73) Assignee: M-I L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/421,351

(22) Filed: Apr. 9, 2009

(65) Prior Publication Data

US 2009/0275487 A1 Nov. 5, 2009

Related U.S. Application Data

(60) Continuation of application No. 11/737,303, filed on Apr. 19, 2007, now Pat. No. 7,538,074, which is a division of application No. 10/610,499, filed on Jun. 30, 2003, now Pat. No. 7,267,291, which is a continuation-in-part of application No. 09/230,302, filed as application No. PCT/EP97/03802 on Jul. 16, 1997, now Pat. No. 6,586,372.

(30) Foreign Application Priority Data

Jul. 24, 1996 (GB) ................................. 9615549.4

(51) Int. Cl.
B02C 23/18 (2006.01)
B02C 19/00 (2006.01)
C09K 8/03 (2006.01)

(52) U.S. Cl. .............................. 241/16; 241/14; 241/15; 241/30; 507/901; 507/904; 507/906

(58) Field of Classification Search .................. 241/15, 241/16, 17, 18, 19, 20, 21, 30; 507/901, 507/904, 906
See application file for complete search history.

(56) References Cited

U.S. PATENT DOCUMENTS 6,380,136 B1 * 4/2002 Bates et al. ................... 507/90

* cited by examiner

Primary Examiner—Michael J Feely

(57) ABSTRACT

A method of formulating a wellbore fluid that includes grinding a solid particulate material and a polymeric dispersing agent to provide a resulting polymer coated solid material, and suspending the resulting polymer coated solid material in the wellbore fluid. At least a portion of the resulting polymer coated solid material has a particle diameter less than 2.0 microns, wherein the polymeric dispersing agent has a molecular weight greater than 10,000. Exemplary starting materials for the solid material include weighting agents including barite, calcium carbonate, dolomite, ilmenite, hematite or other iron ores, olivine, siderite and strontium sulfate as well as mixture and combinations of these and other similar weighting materials. The dispersant in one illustrative embodiment is a polymeric acrylate ester made from the monomers of stearyl methacrylate, butylacrylate, and acrylic acid.

5 Claims, No Drawings

ADDITIVE FOR INCREASING THE DENSITY OF AN OIL-BASED FLUID AND FLUID COMPRISING SUCH ADDITIVE

CROSS-REFERENCE TO RELATED APPLICATIONS

This application is a continuation of U.S. application Ser. No. 11/737,303, filed Apr. 19, 2007, now U.S. Pat. No. 7,538,074, which is a divisional application of U.S. application Ser. No. 10/610,499, filed Jun. 30, 2003, now U.S. Pat. No. 7,267,291, which is a continuation-in-part of U.S. patent application Ser. No. 09/230,302, filed Sep. 10, 1999, now U.S. Pat. No. 6,586,372, which in turn is the U.S. national phase of International Application No. PCT/EP97/03802, filed Jul. 16, 1997 which in turns claims priority to United Kingdom Application No. GB 9615549.4, filed Jul. 24, 1996.

BACKGROUND OF THE INVENTION

One of the most important functions of a wellbore fluid is to contribute to the stability of the well bore, and control the flow of gas, oil or water from the pores of the formation in order to prevent, for example, the flow or blow out of formation fluids or the collapse of pressured earth formations. The column of fluid in the hole exerts a hydrostatic pressure proportional to the depth of the hole and the density of the fluid. High-pressure formations may require a fluid with a specific gravity of up to 3.0.

A variety of materials are presently used to increase the density of wellbore fluids. These include dissolved salts such as sodium chloride, calcium chloride and calcium bromide. Alternatively powdered minerals such as barite, calcite and hematite are added to a fluid to form a suspension of increased density. It is also known to utilize finely divided metal such as iron as a weight material. In this connection, the literature discloses a drilling fluid where the weight material includes iron/steel ball-shaped particles having a diameter less than 250 μm and preferentially between 15 and 75 μm. It has also been proposed to use finely powdered calcium or iron carbonate however the difficulty is that the plastic viscosity of such fluids rapidly increases as the particle size decreases.

It is a requirement of wellbore fluids that the particles form a stable suspension, and do not readily settle out. A second requirement is that the suspension should exhibit a low viscosity in order to facilitate pumping and to minimize the generation of high pressures. Another requirement is that the wellbore fluid slurry should exhibit low filtration rates (fluid loss).

Conventional weighting agents such as powdered barite exhibit an average particle diameter ($d_{50}$) in the range of 10-30 μm. To suspend these materials adequately requires the addition of a gallant such as bentonite for water-based fluids, or organically modified bentonite for oil based fluids. A soluble polymer viscosifier such as xanthan gum may be also added to slow the rate of the sedimentation of the weighting agent. However, a penalty is paid in that as more gallant is added to increase the suspension stability, the fluid viscosity (plastic viscosity) increases undesirably resulting in reduced pumpability. This is obviously also the case if a viscosifier is used to maintain a desirably level of solids suspension.

The sedimentation (or "sag") of particulate weighting agents becomes more critical in wellbores drilled at high angles from the vertical, in that sag of, for example, one inch (2.54 cm) can result in a continuous column of reduced density fluid along the upper portion of the wellbore wall. Such high angle wells are frequently drilled over large distances in order to access, for example, remote portions of an oil reservoir. In such instances it is important to minimize a drilling fluid's plastic viscosity in order to reduce the pressure losses over the borehole length. At the same time a high density also should be maintained to prevent a blow out. Further, as noted above with particulate weighting materials the issues of sag become increasingly important to avoid differential sticking or the settling out of the particulate weighting agents on the low side of the wellbore.

Being able to formulate a drilling fluid having a high density and a low plastic viscosity is no less important in deep high pressure wells where high-density wellbore fluids are required. High viscosities can result in an increase in pressure at the bottom of the hole under pumping conditions. This increase in "Equivalent Circulating Density" can result in opening fractures in the formation, and serious losses of the wellbore fluid into the fractured formation. Again, however, the stability of the suspension is important in order to maintain the hydrostatic head to avoid a blow out. The objectives of high-density fluids with low viscosity plus minimal sag of weighting material can be difficult to reconcile. The need therefore exists for materials to increase fluid density that simultaneously provide improved suspension stability and less viscosity increase.

SUMMARY OF THE INVENTION

The claimed subject matter is generally directed to a drilling fluid additive and a method of making the additive for increasing the density of a fluid while at the same time maintaining a useful suspension stability without a significant viscosity increase. In one illustrative embodiment, the method includes comminuting a solid material and a dispersant in a liquid medium, so as to produce solid colloidal particles that are coated with the dispersant. Preferably the colloidal particles have a weight average particle diameter ($D_{50}$) of less than about 10 μm and more preferably less than about 2 μm. The liquid medium is preferably an oleaginous fluid and more preferably an oleaginous liquid that is environmentally acceptable as the continuous phase of an oil based drilling fluid. In order to achieve an optimal and safe grinding process the oleaginous fluid preferably has a kinematic viscosity less than 10 centistokes (10 mm$^2$/s) at 40° C. and a flash point of greater than 60° C. Illustrative examples of such oleaginous fluids include diesel oil, mineral or white oils, n-alkanes or synthetic oils such as alpha-olefin oils, ester oils or poly(alpha-olefins), as well as combinations and mixtures of these and similar fluids which should be know to one of skill in the art. The dispersant that is coated onto the solid particle during the course of grinding is, in one illustrative embodiment, selected from carboxylic acids of molecular weight of at least 150 Daltons. Alternatively, the dispersant coating may be made of compounds including oleic acid, polybasic fatty acids, alkylbenzene sulfonic acids, alkane sulfonic acids, linear alpha-olefin sulfonic acid or the alkaline earth metal salts of any of the above acids, and phospholipids as well as mixtures and combinations of these compounds. In another alternative and illustrative embodiment the dispersant is a polymeric compound, preferably a polyacrylate ester. The illustrative polymeric dispersant should have an average molecular weight from about 10,000 Daltons to about 200,000 Daltons and more preferably from about 17,000 Daltons to about 30,000 Daltons. The solid material may be selected from a wide variety of known weighting materials and in one illustrative embodiment the solids material is selected from the group consisting of barite, calcium carbonate, dolomite, ilmenite, hematite or other iron ores, olivine, siderite, and strontium sulfate, mixtures and combinations of these and similar weighting materials that should be known to one of skill in the art. In one preferred illustrative embodiment, the comminuting of the solid material and the dispersant in the liquid medium is carried out in an agitated fluidized bed of particulate grinding material.

These and other features of the claimed subject matter are more fully set forth in the following description of preferred or illustrative embodiments of the invention.

DESCRIPTION OF ILLUSTRATIVE EMBODIMENTS

It is known in the art that reduced particle sedimentation rates can be obtained by reducing the particle size used. However, the conventional view in the drilling industry is that reducing the particle size causes an undesirable increase in viscosity. The rapid increase in viscosity as particle size decreases is believed to be caused by an increase in the surface area of the particles causing the increased adsorption of water onto the surface of the particles. As reported in, "Drilling and Drilling Fluids" Chilingarian G. V. and Vorabutor P. 1981, pages 441-444, "The difference in results (i.e. increase in plastic viscosity) when particle size is varied in a mud slurry is primarily due to magnitude of the surface area, which determines the degree of adsorption (tying up) of water. More water is adsorbed with increasing area." Further it is also stated "Viscosity considerations often will not permit the addition of any more of the colloidal solids necessary to control filtration, unless the total solids surface area is first reduced by removing a portion of the existing clays". Thus it is reported in the literature that colloidal fines, because of their high surface area to volume ratio, will adsorb significantly more drilling fluid than and larger particles. Because of this high adsorption of drilling fluid to the surface of the particle, an increase in the viscosity (i.e. a decrease in the fluidity) of the mud is observed. For these reasons, one of skill in the art should understand and appreciate that it is necessary in weighted particulate muds to remove the fine solids to reduce the viscosity increase cause by such fine particles. This concept is reflected in the API specification for barite as a drilling fluid additive. As indicated in the API specification the % w/w of particles having a diameter below 6 μm is limited to 30% w/w maximum in order to minimize viscosity increases.

In view of the above, one of skill in the art should immediately appreciate and understand that it is very surprising that the products of this invention, which utilize particles ground to an average particle diameter ($d_{50}$) of less than 2 μm, provide wellbore fluids of reduced plastic viscosity while at the same time greatly reducing sedimentation or sag.

The additives of this invention comprise solid colloidal particles with a deflocculating agent or dispersant coated onto the surface of the particle. The fine particle size generates high density suspensions or slurries that show a reduced tendency to sediment or sag, while the dispersant on the surface of the particle controls the inter-particle interactions resulting in lower rheological profiles. Thus it is the combination of high density, fine particle size and control of colloidal interactions by surface coating the particles with a dispersant the reconciles the objectives of high density, lower viscosity and minimal sag.

One of skill in the art will appreciate and understand that the use of small particles in drilling fluids is well known in the art, but for a totally different purpose. For example, in EP-A-119 745 an high-density fluid for blow-out prevention is disclosed that contains water, a first and possibly second weighting agent and a gellant made of fine particles (average diameter from 0.5 to 10 μm). The gelling agent particles are small enough to impart static gel strength to the fluid by virtue of the interparticle attractive forces. One of skill in the art should also appreciate that if the concentration of weighting agent is sufficiently low, no gelling agent is needed in the fluids of EP-A-119 745. Thus, the small particle size imparts to the fluids of EP-A__119 745 the viscosifier properties that result from the high surface area to volume ratio of the small particles. The teachings of the EP-A-119 745 reference and other similar references are exactly opposite to those of the claimed subject matter. That is to say, the teachings of the prior art indicate that small particle size material can be added to a drilling fluid, but that doing so increases the viscosity of the drilling fluid. In contrast, the surprising results of the claimed subject matter is that one can add very fine particulate material that is coated with a dispersant layer and not have the rapid increases in viscosity exhibited by the prior art.

According to the claimed subject matter, a dispersant is coated onto the particulate weighting additive during the comminution (grinding) process. That is to say, coarse weighting additive is ground in the presence of a relatively high concentration of dispersant such that the newly formed surfaces of the fine particles are exposed to and thus coated by the dispersant. It is speculated that this allows the dispersant to find an acceptable conformation on the particle surface thus coating the surface. Alternatively it is speculated that because a relatively higher concentration of dispersant in the grinding fluid, as opposed to that in a drilling fluid, the dispersant is more likely to be absorbed (either physically or chemically) to the particle surface. As that term is used in herein, "coating of the surface" is intended to mean that a sufficient number of dispersant molecules are absorbed (physically or chemically) or otherwise closely associated with the surface of the particles so that the fine particles of material do not cause the rapid rise in viscosity observed in the prior art. By using such a definition, one of skill in the art should understand and appreciate that the dispersant molecules may not actually be fully covering the particle surface and that quantification of the number of molecules is very difficult. Therefore by necessity reliance is made on a results oriented definition. As a result of the inventive process, Applicants have discovered that one can control the colloidal interactions of the fine particles by coating the particle with dispersants prior to addition to the drilling fluid. By doing so, it is possible to systematically control the rheological properties of fluids containing in the additive as well as the tolerance to contaminants in the fluid in addition to enhancing the fluid loss (filtration) properties of the fluid.

Evidence in support of the results oriented definition above can be found in the working examples below as well as the prior art. As is well know to one of skill in the art, in the absence of the coating dispersant, a concentrated slurry of particles having a $d_{50}$ of less than 2 μm, will result in an unpumpable paste or gel. According to the method and compositions of the claimed subject matter, a dispersant is coated onto the particle surface during the grinding or comminution process. This provides an advantageous improvement in the state of dispersion of the particles compared to post addition of the dispersant to fine particles. The presence of the dispersant in the comminution process yields discrete particles which can form a more efficiently packed filter cake and so advantageously reduce filtration rates.

According to one illustrative embodiment, the dispersant is chosen so that it provides the suitable colloidal inter-particle interaction mechanism to make it tolerant to a range of common wellbore contaminants, including salt saturation.

According to a preferred embodiment of the claimed subject matter, the weighting agent of the claimed subject matter is formed of particles that are composed of a material of specific gravity of at least 2.68. This allows wellbore fluids to be formulated to meet most density requirements yet have a particulate volume fraction low enough for the fluid to be pumpable.

A preferred embodiment of this invention is for the weight average particle diameter ($d_{50}$) of the new weighting agent to be less than 1.5 micron. This will enhance the suspension's characteristics in terms of sedimentation or sag stability without the viscosity of the fluid increasing so as to make it unpumpable.

A method of comminuting a solid material to obtain material containing at least 60% by weight of particles smaller than 2 μm is known for example from British Patent Specification No. 1,472,701 or No. 1,599,632. As is taught therein, the coarse mineral in an aqueous suspension is ground within an agitated fluidized bed of a particulate grinding medium for a time sufficient to provide the required particle size distribution. The same process of grinding can be carried out by substituting an oleaginous (oil) based fluid for the aqueous based fluid. An important preferred embodiment aspect of the claimed subject matter is the presence of the dispersing agent in the step of "wet" grinding the mineral.

The colloidal particles may be provided as a concentrated slurry either in an aqueous medium or more preferably as an organic liquid. In the latter case, the organic liquid should be acceptable as a component and have the necessary environmental characteristics required for additives to oil-based drilling fluids. With this in mind it is preferred that the oleaginous fluid have a kinematic viscosity of less than 10 centistokes (10 mm2/s) at 40° C. and, for safety reasons, a flash point of greater than 60° C. Suitable oleaginous liquids are for example diesel oil, mineral or white oils, n-alkanes or synthetic oils such as alpha-olefin oils, ester oils or poly(alpha-olefins), mixtures of these fluids as well as other similar fluids which should be well known to one of skill in the art of drilling fluid formulation.

When the colloidal particles are provided in an aqueous medium, the dispersing agent may be, for example, a water soluble polymer of molecular weight of at least 2,000 Daltons. The polymer is a homopolymer or copolymer of any monomers selected from (but not limited to) the class comprising: acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate. The acid monomers may also be neutralised to a salt such as the sodium salt.

It is known that high molecular weight polymers act as flocculants by bridging between particles while low molecular weight polymers for instance (less than 10,000) act as deflocculants by creating overall negative charges.

It has been found that when the dispersing agent is added while grinding, intermediate molecular weight polymers (in the range 10,000 to 200,000 for example) may be used effectively. Intermediate molecular weight dispersing agents are advantageously less sensitive to contaminants such as salt and therefore are well adapted to wellbore fluids.

Where the colloidal particles are provided in an organic medium, the dispersing agent may be selected for example among carboxylic acids of molecular weight of at least 150 such as oleic acid and polybasic fatty acids, alkylbenzene sulphonic acids, alkane sulphonic acids, linear alpha-olefin sulphonic acid or the alkaline earth metal salts of any of the above acids, phospholipids such as lecithin, as well as similar compounds that should be readily apparent to one of skill in the art. Synthetic polymers may also be utilized such as Hypermer OM-1 (trademark of ICI) or alternatively polyacrylate esters. However, one of skill in the art should appreciate that other acrylate monomers may be used to achieve substantially the same results as disclosed herein. The illustrative polymeric dispersant should have an average molecular weight from about 10,000 Daltons to about 200,000 Daltons and more preferably from about 17,000 Daltons to about 30,000 Daltons.

The colloidal particles are themselves composed of weighting materials that are well known to one of skill in the art of weighting drilling fluids. In one illustrative embodiment, the particles are made from one or more materials selected from but not limited to barium sulphate (barite), calcium carbonate, dolomite, ilmenite, hematite or other iron ores, olivine, siderite, strontium sulphate. Normally the lowest wellbore fluid viscosity at any particular density is obtained by using the highest density colloidal particles. However other considerations may influence the choice of product such as cost, local availability and the power required for grinding. Minerals such as calcium carbonate and dolomite posses the advantage that residual solids or filter cake may be readily removed from a well by treatment with acids.

The compositions resulting from the methods of the claimed subject matter have a surprising variety of applications in drilling fluids, cement, high density fluids and coiled tubing drilling fluids to highlight a few. The new particulate weighting agents have the ability to stabilize the laminar flow regime, and delay the onset of turbulence. It is possible to formulate fluids for several applications including coiled tubing drilling fluids that will be able to be pumped faster before turbulence is encountered, so giving essentially lower pressure drops at equivalent flow rates. The ability to stabilize the laminar flow regime although surprising, is adequately demonstrated in heavy density muds of 20 pounds per gallon (2.39 $g/cm^3$) or higher. Such high density muds using conventional weighting agents with a weight average particle diameter of 10 to 30 μm would exhibit dilatancy with the concomitant increase in the pressure drops due to the turbulence generated. The ability of the new weighting agent to stabilize the flow regime even in the presence of a component of larger particles means that high-density fluids with acceptable rheology are feasible with lower pressure drops.

A further and unexpected application occurs in cement whereby the new weighting agent will generate slurries of a more controlled and lower rheology thus allowing the slurry to be pumped more freely into position. One of skill in the art should appreciate that the reduced particle size will tend to have a less abrasive nature, while its suspension characteristics will reduce the free water and other suspension issues encountered when setting the cement. The high fraction of fines should also act as efficient fluid loss control agents thus preventing gas migration and producing stronger cements.

The fluids of the claimed subject matter may also be used in non-oilfield applications such as dense media separating fluid (to recover ore for example) or as a ship's ballast fluid.

The following examples are to illustrate the properties and performance of the wellbore fluids of the claimed subject matter though the invention is not limited to the specific embodiments showing these examples. All testing was conducted as per API RP 13 B where applicable. Mixing was performed on Silverson L2R or Hamilton Beach Mixers. The viscosity at various shear rates (RPM's) and other rheological properties were obtained using a Fann viscometer. Mud weight were checked using a standard mud scale or an analytical balance. Fluid loss was measured with a standard API fluid loss cell.

In expressing a metric equivalent, the following U.S. to metric conversion factors are used: 1 gal=3.785 liters; 1 lb.=0.454 kg; 1 lb./gal (ppg)=0.1198 g/cm3; 1 bbl=42 gal; 1 lb./bbl (ppb)=2.835 kg/m$^3$; 1 lb/100 ft$^2$=0.4788 Pa.

These tests have been carried out with different grades of barite: a standard grade of API barite, having a weight average particle diameter ($D_{50}$) of about 20 μm; a commercial barite (M) made by milling/grinding barite whilst in the dry state, with an average size of 3 μm-5 μm and colloidal barite according the claimed subject matter (with a $D_{50}$ from 0.5 μm to 1.5 μm), with a dispersant included during the "wet" grinding process. The corresponding particle size distributions are shown FIG. 1. The dispersant is IDSPERSE™ XT (Mark of Schlumberger), an anionic acrylic ter-polymer of molecular weight in the range of 40,000 to 120,000 with carboxylate and other functional groups. This preferred polymer is advantageously stable at temperature up to 200° C., tolerant to a broad range of contaminant, gives good filtration properties and do not readily desorb off the particle surface.

Samples were measured on a Malvern microplus instrument using the presentation (optical model) RI (particle 1.61; absorption 0.1; RI (Dispersant) 1.46. The analysis was done using a drop of the ground material in an oil dispersant.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLE 1

Several 22 ppg [2.63 g/cm$^3$] fluids, based on barium sulphate and water, were prepared using standard barite and colloidal barite according to the invention. The 22 ppg slurry of API grade barite and water was made with no gelling agent to control the inter-particle interactions (Fluid #1). Fluid #2 is also based on standard barite but with a post-addition of two pounds per barrel (5.7 kilograms per cubic meter) IDSPERSE XT. Fluid #3 is 100% new weighting agent with 67% w/w of particles below 1 micron in size and at least 90% less than 2 μm. The results are provided in table 1.

TABLE I

| # | Viscosity at various shear rates (rpm of agitation): Dial reading or "Fann Units" for: | | | | | | Plastic Viscosity mPa·s | Yield Point lb/100 ft$^2$ (Pascals) |
|---|---|---|---|---|---|---|---|---|
| | 600 rpm | 300 rpm | 200 rpm | 100 rpm | 6 rpm | 3 rpm | | |
| 1 | 250 | 160 | 124 | 92 | 25 | 16 | 90 | 70 (34) |
| 2 | 265 | 105 | 64 | 26 | 1 | 1 | 160 | −55 (−26) |
| 3 | 65 | 38 | 27 | 17 | 3 | 2 | 27 | 11 (5) |

Upon review of the above data one of skill in the art should appreciate that the viscosity of Fluid #1 is very high and the slurry was observed to filter very rapidly. It should also be appreciated that if further materials were added to reduce the fluid loss, the viscosity would increase yet further. Also notable is that this system sags significantly over one hour giving substantial free water (ca. 10% of original volume).

The post addition of two pounds per barrel [5.7 kg/cm$^3$] of IDSPERSE XT to this system (Fluid #2) appears to reduce the low shear rate viscosity by controlling the inter-particle interactions. However it will be noted that because of the particle concentration and average particle size, the fluid exhibits dilatency, which is indicated by the high plastic viscosity and negative yield point. It should be appreciated that this will result in substantial pressure drops during the pumping of these fluids. Further it should be noted that Fluid #2 sags immediately on standing.

One of skill in the art should note that with regard to Fluid #3, the fluid exhibits a substantially lower plastic viscosity when compared to Fluids #1 and #2. The presence of the dispersing agent coated onto the particles appears to control the inter-particle interactions, thus making fluid #3 pumpable and not gel-like. It should also be appreciated that the much lower average particle size has stabilized the flow regime. That is to say a review of the data will reveal that the flow is now laminar at 1000 s$^{-1}$ as demonstrated by the low plastic viscosity and positive yield point.

Upon consideration of the above data, one of skill in the art should appreciate that there exists an observable and substantial effect on the rheological properties of the above fluids caused by the coating of the fine particles by the dispersant agent. That is to say, the properties and results of the claimed invention are achieved when the particles are first coated with dispersant and then added to the fluid. This is in contrast to the properties and results achieved when no dispersant is used or when the dispersant is simply added to the drilling fluid along with the particles. One of skill in the art of drilling fluid formulation will appreciate that it is wide-spread practice within the industry to simply combine materials into a base fluid to achieve the desired final formulation. However, as supported by the above data, the coating of a dispersant onto fine particulate weighting materials prior to addition to the base fluid results in a substantial and observable difference in rheological properties that are surprising and unexpected.

EXAMPLE 2

Experiments were conducted to examine the effect of the post addition of the chosen polymer dispersant to a slurry formulated to include weighting agents of the same colloidal particle size. A milled barite ($D_{50}$~4 μm) and a comminuted calcium carbonate (70% by weight of the particles of less than 2 μm) were selected, both of which are of similar particle size to materials disclosed herein. The slurries were prepared at an equivalent particle volume fraction of 0.282. See table II.

The rheologies were measured at 120° F. (49° C.), thereafter an addition of 6 ppb (17.2 kg/m$^3$) IDSPERSE XT was made. The rheologies of the subsequent slurries were finally measured at 120° F. (see table III) with additional API fluid loss test.

TABLE II

| # | Material | Dispersant | Density (ppg) | Volume Fraction | wt/wt |
|---|---|---|---|---|---|
| 4 | New Barite | while grinding | 16.0 [1.92 g/cm$^3$] | 0.282 | 0.625 |
| 5 | Milled Barite | none | 16.0 [1.92 g/cm$^3$] | 0.282 | 0.625 |
| 6 | Milled Barite | post-addition | 16.0 [1.92 g/cm$^3$] | 0.282 | 0.625 |
| 7 | Calcium Carbonate | none | 12.4 [1.48 g/cm$^3$] | 0.282 | 0.518 |
| 8 | Calcium Carbonate | post-addition | 12.4 [1.48 g/cm$^3$] | 0.282 | 0.518 |

TABLE III

| | Viscosity at various shear rates (rpm of agitation): Dial reading or "Fann Units" for: | | | | | | Plastic Viscosity | Yield Point | API Fluid |
|---|---|---|---|---|---|---|---|---|---|
| # | 600 rpm | 300 rpm | 200 rpm | 100 rpm | 6 rpm | 3 rpm | mPa·s | lb/100 ft$^2$ | Loss |
| 4 | 12 | 6 | 4 | 2 | | | 6 | 0 | 11 |
| 5 | os | os | os | os | os | os | | | |
| 6 | 12 | 6 | 4 | 2 | | | 6 | 0 | total[1] |
| 7 | os | os | 260 | 221 | 88 | 78 | | | |
| 8 | 12 | 6 | 4 | 3 | 1 | 1 | 6 | 0 | total[2] |

[1] total fluid loss in 26 minutes
[2] total fluid loss in 20 minutes

Upon review of the above data one of skill in the art will note that no filtration control is gained from post addition of the polymer as revealed by the total fluid loss in the API test.

EXAMPLE 3

This test was carried out to show the feasibility of 24 ppg [2.87 g/cm$^3$] slurries (0.577 Volume fraction). Each fluid contained the following components e.g. Fresh Water 135.4 g, Total Barite 861.0 g, IDSPERSE XT 18.0 g. The barite component was varied in composition according to the following table.

TABLE IV

| # | API grade Barite (%) | Colloidal Barite (%) |
|---|---|---|
| 9 | 100 | 0 |
| 10 | 90 | 10 |
| 11 | 80 | 20 |
| 12 | 75 | 25 |
| 13 | 60 | 40 |
| 14 | 0 | 100 |

Upon review of the results provided table V one of skill in the art should appreciate that API grade barite, because of its particle size and the high volume fraction required to achieved high mud weights, exhibits dilatancy i.e. high plastic and apparent viscosity and negative yield values.

Further it should be noted that introduction of fine grade materials tends to stabilize the flow regime keep it laminar at higher shear rates: plastic viscosity decreases markedly and yield point changes from negative to positive. In addition it will be noticed that no significant increase in low-shear rate viscosity (@ 3 rpm) is caused by the colloidal barite.

The above results will show to one of skill in the art that the colloidal weight material coated with dispersant as is disclosed herein may advantageously be used in conjunction with conventional API barite.

EXAMPLE 4

An eighteen (18) pound per gallon [2.15 g/cm$^3$] slurry of weighting agent according the claimed subject matter was formulated and subsequently contaminated with a range of common contaminants and hot rolled at 300° F. (148.9° C.). The rheological results of before (BHR) and after hot rolling (AHR) are presented below.

TABLE V

| | Viscosity at various shear rates (rpm of agitation): Dial reading or "Fann Units" for: | | | | | | | | | Plastic Viscosity | Yield Point lb/100 ft$^2$ |
|---|---|---|---|---|---|---|---|---|---|---|---|
| # | 600 | 300 | 200 | 117 | 100 | 59 | 30 | 6 | 3 | mPa·s | (Pascals) |
| 9 | *os | 285 | 157 | 66 | 56 | 26 | 10 | 3 | 2 | | |
| 10 | 245 | 109 | 67 | 35 | 16 | 23 | 7 | 3 | 2 | 136 | −27 (−13) |
| 11 | 171 | 78 | 50 | 28 | 23 | 10 | 7 | 3 | 2 | 93 | −15 (−7) |
| 12 | 115 | 55 | 36 | 19 | 17 | 8 | 5 | 3 | 2 | 60 | −5 (−2) |
| 13 | 98 | 49 | 34 | 21 | 20 | 14 | 10 | 4 | 3 | 49 | 0 |
| 14 | 165 | 84 | 58 | 37 | 32 | 22 | 18 | 5 | 3 | 81 | 3 (−1.5) |

*os = off-scale

TABLE VI (New barite)

| | Viscosity (Fann Units) at various shear rates (rpm of agitation: | | | | | | PV | YP lb/100 ft² | Fluid loss |
|---|---|---|---|---|---|---|---|---|---|
| | 600 | 300 | 200 | 100 | 6 | 3 | mPa·s | (Pascals) | ml |
| no contaminant BHR | 21 | 11 | 8 | 4 | 1 | 1 | 10 | 1(0.5) | |
| no contaminant AHR | 18 | 10 | 7 | 4 | 1 | 1 | 8 | 2(1) | 5.0 |
| +80 ppb NaCl BHR | 41 | 23 | 16 | 10 | 2 | 1 | 18 | 5(2.5) | |
| +80 ppb NaCl AHR | 26 | 14 | 10 | 6 | 1 | 1 | 12 | 2(1) | 16 |
| +30 ppb OCMA[1] BHR | 38 | 22 | 15 | 9 | 2 | 1 | 16 | 6(3) | |
| +30 ppb OCMA AHR | 26 | 14 | 10 | 6 | 1 | 1 | 12 | 2(1) | 6.8 |
| +5 ppb Lime BHR | 15 | 7 | 5 | 3 | 1 | 1 | 8 | −1(−0.5) | |
| +5 ppb Lime AHR | 10 | 5 | 4 | 2 | 1 | 1 | 5 | 0 | 6.4 |

[1]OCMA = OCMA clay, a fine particle ball clay commonly used to replicate drilled solids contamination acquired from shale sediments during drilling Upon review of the above results one of skill in the art should appreciate that the dispersant coated weight material system shows excellent resistance to contaminants, low controllable rheology and gives fluid loss control under a standard API mud test as shown in following table VI. An equivalent set of fluids were prepared using API conventional barite without the polymer coating as a direct comparison of the two particle types. (Table VII)

TABLE VII (Conventional API Barite)

| | Viscosity (Fann Units) at various shear rates (rpm of agitation: | | | | | | PV | YP lb/100 ft² | Fluid loss |
|---|---|---|---|---|---|---|---|---|---|
| | 600 | 300 | 200 | 100 | 6 | 3 | mPa·s | (Pascals) | ml |
| no contaminant BHR | 22 | 10 | 6 | 3 | 1 | 1 | 12 | −2 | |
| no contaminant AHR | 40 | 24 | 19 | 11 | 5 | 4 | 16 | 8 | Total[1] |
| +80 ppb NaCl BHR | 27 | 13 | 10 | 6 | 2 | 1 | 14 | −1 | |
| +80 ppb NaCl AHR | 25 | 16 | 9 | 8 | 1 | 1 | 9 | 7 | Total[1] |
| +30 ppb OCMA BHR | 69 | 55 | 49 | 43 | 31 | 26 | 14 | 31 | |
| +30 ppb OCMA AHR | 51 | 36 | 31 | 25 | 18 | 16 | 15 | 21 | Total[2] |
| +5 ppb Lime BHR | 26 | 14 | 10 | 6 | 2 | 1 | 12 | 2 | |
| +5 ppb Lime AHR | 26 | 14 | 10 | 6 | 1 | 1 | 12 | 2 | Total[1] |

[1]Total fluid loss within 30 seconds
[2]Total fluid loss within 5 minutes.

Upon comparison of the two sets of data, one of skill in the art should appreciate the that the weighting agent according the claimed subject matter has considerable fluid loss control properties when compared to the API barite. Further it will be noted that the API barite also shows sensitivity to drilled solids contamination whereas the new barite system is more tolerant.

EXAMPLE 5

An experiment was conducted to demonstrate the ability of the new weighting agent to formulate drilling muds with densities above 20 pound per gallon [2.39 g/cm$^3$].

Two twenty two pound per gallon [2.63 g/cm$^3$] mud systems were formulated, the weighting agents comprised a blend of 35% w/w new barite weighting agent with 65% w/w API grade Barite (Fluid #1) weighting agent and 100% API grade barite (fluid #2), both with 11.5 pound per barrel [32.8 kg/m$^3$] STAPLEX 500 (mark of Schlumberger, shale stabiliser), 2 pound per barrel [5.7 kg/m$^3$] IDCAP (mark of Schlumberger, shale inhibitor), and 3.5 pound per barrel [10 kg/m$^3$] KCl. The other additives provide inhibition to the drilling fluid, but here demonstrate the capacity of the new formulation to cope with any subsequent polymer additions. The fluid was hot rolled to 200° F. (93.3° C.). Results are provided in table VIII.

Upon review of the above data one of skill in the art should appreciate that the 100% API grade barite has very high plastic viscosity and is in fact turbulent as demonstrated by the negative yield point. Further it will be noticed that after hot rolling the rheology is so high it is off scale.

EXAMPLE 6

This experiment demonstrates the ability of the new weighting agent in low viscosity fluids (i.e. high fluidity formulations). The weighting agent is 100% colloidal barite according the claimed subject matter. Fluid #15 is a synthetic based drilling fluid (Ultidrill, Mark of Schlumberger, a linear alpha-olefin having 14 to 16 carbon atoms). Fluid #16 is a water-based mud and includes a viscosifier (0.5 ppb IDVIS, Mark of Schlumberger, a pure xanthan gum polymer) and a fluid loss control agent (6.6 ppb IDFLO Mark of Schlumberger). Fluid #15 was hot rolled at 200° F. (93.3° C.), fluid #16 at 250° F. (121.1° C.). After hot rolling results are shown table IX.

TABLE VIII

| | Viscosity (Fann Units) at various shear rates (rpm of agitation: | | | | | | PV | Yield Point lb/100 ft$^2$ | Fluid Loss |
|---|---|---|---|---|---|---|---|---|---|
| | 600 | 300 | 200 | 100 | 6 | 3 | mPa·s | (Pascals) | ml |
| Before Hot Rolling (#1) | 110 | 58 | 46 | 30 | 9 | 8 | 52 | 6 (2.9) | |
| After Hot Rolling (#1) | 123 | 70 | 52 | 30 | 9 | 8 | 53 | 17 (8.1) | 8.0 |
| Before Hot Rolling (#2) | 270 | 103 | 55 | 23 | 3 | 2 | 167 | −64 (−32) | |
| After Hot rolling (#2) | os | 177 | 110 | 47 | 7 | 5 | | | 12.0 | os: off-scale

TABLE IX

| | Viscosity (Fann Units) at various shear rates (rpm of agitation: | | | | | | PV | Gels[1] lbs/100 ft² | Yield Point lbs/100 ft² |
|---|---|---|---|---|---|---|---|---|---|
| | 600 | 300 | 200 | 100 | 6 | 3 | mPa·s | (Pascals) | (Pascals) |
| #15: 13.6 ppg [1.63 g/cm³] | 39 | 27 | 23 | 17 | 6 | 5 | 12 | 7/11 | 15 |
| #16: 14 ppg [1.67 g/cm³] | 53 | 36 | 27 | 17 | 6 | 5 | 17 | 5/— | 19 |

[1] A measure of the gelling and suspending characteristics of the fluid, determined at 10 sec/10 min using a Fann viscosimeter.

Upon review of the above representative test data, one of skill in the art should appreciate that that the new weighting agents disclosed herein provide a way to formulate brine analogues fluids useful for slimhole applications or coiled tubing drilling fluids. Further it will be noted that the rheology profile is improved by the addition of colloidal particles.

EXAMPLE 7

An experiment was conducted to demonstrate the ability of the new weighting agent to formulate completion fluids, were density control and hence sedimentation stability is a prime factor. The weighting agent is composed of the new colloidal barite according to the claimed subject matter with 50 pound per barrel [142.65 kg/m³] standard API grade calcium carbonate which acts as a bridging agent. The 18.6 ppg [2.23 g/cm³] fluid was formulated with 2 pound per barrel [5.7 kg/m³] PTS 200 (mark of Schlumberger, pH buffer) The static ageing tests were carried out at 400° F. (204.4° C.) for 72 hours. Upon review of the exemplary results shown in the table below, one of skill in the art will note that before (BSA) and after (ASA) static ageing a good stability to sedimentation and rheological profile can be achieved.

| | Viscosity (Fann Units) at various shear rates (rpm of agitation): | | | | | | PV | YP lb/100 ft² | Free water * |
|---|---|---|---|---|---|---|---|---|---|
| | 600 | 300 | 200 | 100 | 6 | 3 | mPa·s | (Pascals) | ml |
| 18.6 ppg BSA | 37 | 21 | 15 | 11 | 2 | 1 | 16 | 5 (2.5) | — |
| 18.6 ppg ASA | 27 | 14 | 11 | 6 | 1 | 1 | 13 | 1 (0.5) | 6 |

* free water is the volume of clear water that appears on top of the fluid. The remainder of the fluid has uniform density.

EXAMPLE 8

This experiment demonstrates the ability of the new weighting agent to formulate low viscosity fluids and show it's tolerance to pH variations. The weighting agent is composed of the new colloidal barite according to the claimed subject matter. The 16 ppg [1.91 g/cm³] fluid was formulated with caustic soda to adjust the pH to the required level, with the subsequent fluid rheology and API filtration tested.

| | Viscosity (Fann Units) at various shear rates (rpm of agitation: | | | | | | PV | Yield Point lb/100 ft² | Fluid Loss |
|---|---|---|---|---|---|---|---|---|---|
| pH | 600 | 300 | 200 | 100 | 6 | 3 | mPa·s | (Pascals) | ml |
| 8.01 | 14 | 7 | 5 | 3 | | | 7 | 0 (0) | 8.4 |
| 9.03 | 14 | 8 | 5 | 3 | | | 6 | 2 (1) | 8.5 |
| 10.04 | 17 | 9 | 6 | 3 | | | 8 | 1 0.5) | 7.9 |
| 10.97 | 17 | 9 | 6 | 3 | | | 8 | 1 (0.5) | 7.9 |
| 12.04 | 19 | 10 | 7 | 4 | 1 | 1 | 9 | 1 (0.5) | 8.1 |

Upon review of the exemplary results one of skill in the art should concluded that a good stability to pH variation and rheological profile is established in the fluids formulated using the coated weighting agents disclosed herein.

EXAMPLE 9

This experiment demonstrates the ability of the new weighting agent to formulate low rheology high temperature, high pressure stable water base fluids. The weighting agent is composed of the new colloidal barite according to the claimed subject matter, with 10 pounds per barrel [28.53 kg/m³] CALOTEMP (mark of Schlumberger, fluid loss additive) and 1 pound per barrel [2.85 kg/m³] PTS 200 (mark of Schlumberger, pH buffer). The 17 ppg [2.04 g/m³] and 18 ppg [2.16 g/cm³] fluids were static aged for 72 hours at 250° F. (121° C.).

| Density | | Viscosity (Fann Units) at various shear rates (rpm of agitation:) | | | | | | PV | Yield Point lb/100 ft² | Free water | Fluid Loss |
|---|---|---|---|---|---|---|---|---|---|---|---|
| ppg | PH | 600 | 300 | 200 | 100 | 6 | 3 | mPa·s | (Pascals) | ml | ml |
| 17 | 7.4 | 28 | 16 | 11 | 6 | 1 | 1 | 12 | 4 (2) | 10 | 3.1 |
| 18 | 7.5 | 42 | 23 | 16 | 10 | 1 | 1 | 19 | 4 (2) | 6 | 3.4 |

Upon review of the above illustrative results, one of skill in the art should appreciate that the fluids formulated in accordance with the present disclosure exhibit good stability to sedimentation and low rheological profile with the subsequent filtration tested.

EXAMPLE 10

The following example demonstrates that an oleaginous based drilling fluid containing the coated solids of the present invention gives better overall performance, with particular benefits in static sag, dynamic sag and fluid loss. Three fluids were formulated the first in accordance with the teachings of the present disclosure, the second with fine grind Norway barite and EMI759 as a dispersant and a third fluid formulated with fine Chinese precipitated barite and EMI759 dispersant.

The following table provides the exemplary results obtained from the particle size analysis using the Malvern Microplus instrument. The measurements were all taken in oil dispersant.

| Particle Size Distributions | | | |
|---|---|---|---|
| Barite | $D_{10}$ | $D_{50}$ | $D_{90}$ |
| Dispersant coated barite | 0.31 | 1.04 | 3.27 |
| Chinese Precipitated | 0.32 | 1.30 | 3.01 |
| Norway Fine Grind | 0.94 | 7.86 | 31.25 |

One of skill in the art should appreciate that the Norway Fine Grind barite would be considered to be on the fine end of the API standard grind for barite. The fluids were formulated as indicated in the following table. Each fluid was formulated to a density of 13 ppg and an oil to water (O/W) ration of 80/20.

| Fluid Formulations | | | |
|---|---|---|---|
| Product | Norway Barite (ppb) | Precipitated Barite (ppb) | Dispersant Coated Barite (ppb) |
| EDC99 | As required | As required | As required |
| Chinese pptd Barite | — | As required | — |
| Norway fine Barite | As required | — | — |
| OBWARP | — | — | As required |
| Poly-acrylate ester dispersant * | 7.5 | 7.5 | — |
| Fatty acid amide emulsifier | 10 | 10 | 10 |
| Organoclay thickening agent | 3 | 3 | 3 |
| Lime | 6 | 6 | 6 |
| CaCl₂ Brine (25 w %) | As required | As required | As required |
| Gilsonite-base fluid loss control additive | 2 | 2 | 2 |

* Note:
The amount added to the drilling fluid is equivalent to the amount of compound coated onto the dispersant coated barite.

The fluids were tested before and after aging at 250° F. The rheologies were measured at 120° F. using a Fann 35 and the fluid loss values were measured at 250° F. The dynamic sags were measured on a Fann 35 at 120° F. after 30 mins at 100 rpm. The static sags were measured after aging the fluid at 250° F. for 40 hours. The following table provides illustrative and exemplary data:

| Fluid Properties - Dispersant Coated Barite | | | | | | |
|---|---|---|---|---|---|---|
| | Fluid | | | | | |
| | Base | | +20 ppb HMP | | +10% v/v Seawater | |
| | BHR | AHR | BHR | AHR | BHR | AHR |
| 600 | 31 | 37 | 39 | 47 | 40 | 44 |
| 300 | 17 | 20 | 21 | 25 | 22 | 24 |
| 200 | 12 | 14 | 15 | 18 | 15 | 17 |
| 100 | 7 | 8 | 9 | 10 | 9 | 10 |
| 6 | 1 | 1 | 1 | 1 | 1 | 2 |
| 3 | 1 | 1 | 1 | 1 | 1 | 1 |
| Gels | | 2/4 | | 2/5 | | 2/4 |
| PV | 14 | 17 | 18 | 22 | 18 | 20 |
| YP | 3 | 3 | 3 | 3 | 4 | 4 |
| ES | | 731 | | 810 | | 405 |
| HTHP FL (250° F.) | | 2.2 | | 1.2 | | 1.2 |
| Dynamic Sag Factor | | 0.501 | | — | | — |
| Static Sag Factor | | 0.509 | | — | | — |

Fluid Properties with Dry Powder Barites Added

| | Norway Fine Grind Barite | | | | | | Chinese Precipitated Barite | | | | | |
|---|---|---|---|---|---|---|---|---|---|---|---|---|
| | Base | | +20 ppb HMP | | +10% v/v Seawater | | Base | | +20 ppb HMP | | +10% v/v Seawater | |
| | BHR | AHR | BHR | AHR | BHR | AHR | BHR | AHR | BHR | AHR | BHR | AHR |
| 600 | 36 | 40 | 43 | 46 | 44 | 43 | 36 | 40 | 43 | 60 | 44 | 54 |
| 300 | 20 | 21 | 23 | 25 | 24 | 23 | 20 | 22 | 24 | 32 | 24 | 30 |
| 200 | 13 | 14 | 15 | 17 | 16 | 16 | 15 | 16 | 17 | 22 | 17 | 21 |
| 100 | 7 | 8 | 8 | 10 | 9 | 9 | 8 | 9 | 10 | 12 | 10 | 12 |
| 6 | 1 | 1 | 1 | 1 | 1 | 1 | 1 | 1 | 1 | 1 | 2 | 2 |
| 3 | 1 | 1 | 1 | 1 | 1 | 1 | 1 | 1 | 1 | 1 | 1 | 1 |
| Gels 10'/10" | — | 1/3 | — | 1/5 | — | 1/5 | — | 1/4 | — | 1/6 | — | 2/4 |
| PV | 16 | 19 | 20 | 21 | 16 | 20 | 16 | 18 | 19 | 28 | 20 | 24 |
| YP | 4 | 2 | 3 | 4 | 8 | 3 | 4 | 4 | 5 | 4 | 4 | 6 |
| ES | | 830 | | 715 | | 355 | | 802 | | 629 | | 371 |
| HTHP FL 250° F. | | 2.0 | | 3.6 | | 1.8 | | 8.8 | | 12.0 | | — |
| Dynamic Sag Factor | | 0.527 | | — | | — | | 0.525 | | — | | — |
| Static Sag Factor | | 0.718 | | — | | — | | 0.664 | | — | | — |

Upon careful review, one of skill in the art should appreciate that the results demonstrate that each base fluid has similar rheological properties, after clay and seawater contamination however, the fluid formulated with precipitated barite gives a greater increase in PV than the Norway barite and the fluids containing the dispersant coated weight materials of the present disclosure. This increase in plastic viscosity may be due to the 'uncoated' fines present in the fluid. Further such a skilled artisan in comparing the fluid loss properties of the three fluids should see that the fluids containing the coated weighting solids of the present disclosure show the best overall performance, although the Norway barite also gives a similar performance. The precipitated barite fluid however, has a much poorer fluid loss. This is most likely due to the very narrow particle size distribution of the precipitated barite as well as the coating effect of the barite particles being less effective by this process. A skilled person in the art of drilling fluids should note that the most significant difference between the three fluids is in their sag performance. The fluid containing the coated weight materials disclosed herein demonstrates very good sag properties, both for dynamic and static aged sag. The coarser Norway fine grind barite gave very poor sag performance, for both the dynamic and static sag tests. This is perhaps to be expected for an un-optimized fluid using a coarser grind of barite, but it will also be appreciated that optimization to improve its sag performance will compromise the low rheological properties of the fluid. The Chinese precipitated barite has a much finer particle size distribution similar to the solids of the present disclosure, however its sag performance was also very poor for both the dynamic and the static sag tests. This may also be due to the ineffective coating of the barite by this process.

Upon further review of the above data one of skill in the art should conclude that in comparing the three different barites, similar rheologies are achieved despite their different particle sizes. Further it will be noted that the three base fluids give very similar rheologies demonstrates the benefits of a fluid formulated using the coated colloidal particles of the present disclosure. Further it will be noted that fluids containing the solids of the present disclosure exhibit excellent sag performance and fluid loss results compared to the other fluids. This logically would lead a skilled person to conclude that in order to formulate the other fluids to meet similar performance is likely to result in a much higher rheology fluid.

In view of the above disclosure, one of ordinary skill in the art should understand and appreciate that one illustrative embodiment of the claimed subject matter includes a wellbore fluid having an oleaginous phase and an additive for increasing the density of the wellbore fluid. The additive comprises solid colloidal particles coated with a dispersant. The dispersant is coated onto the colloidal particle during the comminution process of forming the particles. The illustrative particles have a weight average particle diameter ($D_{50}$) of less than 2 μm and preferably a $D_{50}$ of less than 1.5 μm diameter. Preferably, the colloidal particles are composed of a material of specific gravity of at least 2.68. Exemplary starting materials for the colloidal particles include many commonly known weighting agents including barite, calcium carbonate, dolomite, ilmenite, hematite or other iron ores, olivine, siderite, and strontium sulfate as well as mixture and combinations of these and other similar weighting materials. The dispersant that is coated onto the particle during the course of grinding is, in one illustrative embodiment, selected from carboxylic acids of molecular weight of at least 150 Daltons. Alternatively, the dispersant coating may be made of compounds including oleic acid, polybasic fatty acids, alkylbenzene sulfonic acids, alkane sulfonic acids, linear alpha-olefin sulfonic acid or the alkaline earth metal salts of any of the above acids, and phospholipids as well as mixtures and combinations of these compounds. In another alternative and illustrative embodiment the dispersant is a polymeric compound, preferably a polyacrylate ester. The illustrative polymeric dispersant should have an average molecular weight from about 10,000 Daltons to about 200,000 Daltons and more preferably from about 17,000 Daltons to about 30,000 Daltons.

The claimed subject matter also encompasses a method of making an additive for increasing the density of a fluid. In one illustrative embodiment, the method includes comminuting a solid material and a dispersant in a liquid medium, so as to produce solid colloidal particles having a weight average particle diameter (D50) of less than 2 μm that are coated with the dispersant. The liquid medium is preferably an oleaginous fluid and more preferably an oleaginous liquid having a kinematic viscosity less than 10 centistokes (10 mm2/s) at 40° C. and a flash point of greater than 60° C. Illustrative examples of such oleaginous fluids include diesel oil, mineral or white oils, n-alkanes or synthetic oils such as alpha-olefin oils, ester oils or poly(alpha-olefins) as well as combinations and mixtures of these an similar fluids. The dispersant that is coated onto the particle during the course of grinding is, in one illustrative embodiment, selected from carboxylic acids of molecular weight of at least 150. Alternatively, the dispersant coating may be made of compounds including oleic acid, polybasic fatty acids, alkylbenzene sulfonic acids, alkane sulfonic acids, linear alpha-olefin sulfonic acid or the alkaline earth metal salts of any of the above acids, and phospholipids as well as mixtures and combinations of these compounds. In another alternative and illustrative embodiment the dispersant is a polymeric compound, preferably a polyacrylate ester. Optimally the illustrative dispersant is made of stearyl methacrylate, butylacrylate and acrylic acid monomers. The illustrative polymeric dispersant should have an average molecular weight from about 10,000 Daltons to about 200,000 Daltons and more preferably from about 17,000 Daltons to about 30,000 Daltons. The solid material may be selected from a wide variety of known weighting materials and in one illustrative embodiment the solid material is selected from the group consisting of barite, calcium carbonate, dolomite, ilmenite, hematite or other iron ores, olivine, siderite, and strontium sulfate, mixtures and combinations of these and similar weighting materials that should be known to one of skill in the art. In one preferred illustrative embodiment, the comminuting of the solid material and the dispersant in the liquid medium is carried out in an agitated fluidized bed of a particulate grinding material.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method of making a wellbore fluid, the method comprising:
   grinding a solid particulate material and a polymeric dispersing agent in a liquid medium, such that the polymeric dispersing agent coats the surface of the resulting colloidal solid particles, wherein the resulting polymer coated solid material has a weight average particle diameter of less than about 2 microns, and wherein the polymeric dispersing agent is a polymeric acrylate ester made from the monomers of stearyl methacrylate, butylacrylate, and acrylic acid; and
   increasing the density of the wellbore fluid with the resulting polymer coated solid material.

2. The method of claim 1, further comprising selecting the solid particulate material to have specific gravity of at least 2.68.

3. The method of claim 1, wherein the solid material is selected from the group consisting of barite, calcium carbonate, dolomite, ilmenite, iron ores, olivine, siderite, strontium sulfate, and combinations thereof.

4. The method of claim 1, wherein the liquid medium is an oleaginous base fluid.

5. The method of claim 4, wherein the base fluid is selected from the group consisting of: diesel oil, mineral oil, white oil, n-alkanes, synthetic oils, saturated and unsaturated poly(alpha-olefins), esters of fatty acid carboxylic acids and combinations thereof.

* * * * *